Patented Feb. 8, 1949

2,461,080

UNITED STATES PATENT OFFICE 2,461,080

ANTIOXIDANT FOR FATS

Michael M. Piskur and James W. Higgins, Chicago, Ill., assignors to Swift & Company, Chicago, Ill., a corporation of Illinois No Drawing. Application June 9, 1945,
Serial No. 598,628

6 Claims. (Cl. 99—163)

This invention relates to the stabilization of fats and oils, especially animal fats, including lard, tallow, and butter oil, against rancidity. More particularly the invention has to do with the retarding of oxidative changes in such materials by means of an improved antioxidant.

An object of the invention is to provide an antioxidant for animal fats which is a by-product and relatively inexpensive.

Another object of this invention is the use of an edible antioxidant for the stabilization of edible animal fats.

A further object of the invention is the provision of a process for the addition of an antioxidant to animal fats which does not add color, odor, or flavor to the product which is desired to be stabilized.

A still further object of the invention is the provision of a process which allows the addition of natural fibrous material containing antioxidant substances to an animal fat with the subsequent removal of the spent fibrous material.

Other objects and advantages of the invention will appear in the course of the description of the invention hereinafter given.

In the preparation of animal fats and oils an important problem is the prevention of deterioration such as spoilage and rancidity. During the processing of edible oils and fats the natural antioxidants contained in the fatty tissues are often lost, making the product more susceptible to such deterioration. The usual means of preserving fatty food stuffs are freezing, packing under vacuum, dehydration or the incorporation therein of a material containing an antioxidant substance, or combinations of the aforementioned means.

The present invention has to do with the use of antioxidant substance or substances contained in the peel, pulp, or albedo tissue of citrus fruits. The fibrous portion of any of the citrus fruits, lemon, orange, grapefruit, etc., may be used. A combination of two or more of these may be used if desired. By albedo tissue is meant the white fibrous portion of the fruit underlying the peel, while the pulp is that fibrous material of the fruit obtained after the expression of the juice from the fruit. By mixing with the fatty material a combination of the peel and pulp, dried or raw, after comminution, good results are obtained, equal in effect to those produced by the use of either the peel alone or the pulp alone. If it is desired to use either the raw or dried material, the amounts of either to be used will vary, as hereinafter described. Because of the complex nature of this portion of the citrus fruit, the substance causing the inhibitory effect is not definitely known.

The amount of the antioxidant added may vary from 0.1 per cent to 1.0 per cent by weight of either dried or raw comminuted peel, pulp, or albedo tissue of the citrus fruit. For the dried form of the antioxidant containing material, the incorporation of 0.1 per cent of the dried material appears to be sufficient to give good results, as shown by the following data:

|  | AOM, hours |
|---|---|
| Original prime steam lard | 3 |
| Original prime steam lard+0.1% dried orange peel | 8 |
| Original prime steam lard+1.0% dried orange peel | 8 |

Each of the samples was subsequently deodorized for one hour at 180° C. AOM denotes Active Oxygen Method for the determination of fat stability, Oil & Soap, vol. 10, p. 105, 1933.

When the material is added in the raw state, it has been found that about 0.5 per cent is often necessary to give optimum results. This is equivalent to about 0.15 per cent dry material.

The antioxidant material is preferably added before subjecting the fat to operations which involve heat treatment at elevated temperatures, such as bleaching, deodorizing, rendering, etc. When the material is added prior to rendering or bleaching, the spent fibrous matter is conveniently removed in the usual filtering operations. The following data were obtained on a sample of prime steam lard using raw, undried, comminuted orange peel:

|  | AOM | Color |
|---|---|---|
| Original Prime Steam Lard deodorized at 175° C. | Hours 3 | 5.0Y-1.4R |
| Original Prime Steam Lard+0.5% raw orange peel deodorized at 100° C. | 6 | 5.0Y-1.3R |
| Original Prime Steam Lard+0.5% raw orange peel deodorized at 150° C. | 6 | 6Y-1.4R |
| Original Prime Steam Lard+0.5% raw orange peel deodorized at 175° C. | 5 | 6Y-1.5R |
| Original Prime Steam Lard+0.5% raw orange peel deodorized at 200° C. | 4 | 6Y-1.7R |

The data shows that deodorization for one hour at temperatures varying from 100° C. to 200° C. produces improved results and a temperature within the range between 100° C. and 150° C. gives best results. Color was determined according to the Lovibond scale.

While the aforesaid citrus products are useful for treating the fat prior to rendering, we have found that improved results are often obtained by including with the citrus products certain auxiliary agents. For example, the addition of a small amount of soybean lecithin, such as 0.1 per cent to 0.5 per cent, or phosphoric acid, such as 0.05 per cent to 0.5 per cent, in combination with the citrus antioxidant material, produces enhanced results. The effects of such a mixture are synergistic. For example, the following results were obtained on a fat from pork trimmings, dry rendered with and without the antioxidant, as indicated, at 140° C., and filtered:

| | AOM, hours |
|---|---|
| Control sample | 1 |
| Fat+0.1% dry orange peel | 3 |
| Fat+0.1% dry orange peel and 0.1% soybean lecithin | 7 |
| Fat+0.1% dry orange peel and 0.05% phosphoric acid | 5 |

In case it is desired to add the comminuted fibrous material of the lemon, orange, or grapefruit to the fat after the fat has been processed as by rendering and/or bleaching, the dried or raw peel or pulp, or a combination of both, is incorporated with the fat by thorough mixing and warmed to a temperature sufficient to melt the fat, approximately 50° C. to 60° C., thus providing for a more thorough absorption of the antioxidant by the fat and in a state adapted for the ready separation of the spent fibrous material by filtering.

The present invention has the advantage that, being a by-product of an industry concerned with the canning of citrus fruits and juices, the supply of the citrus fruit offal is practically inexhaustible and consequently very inexpensive. These materials are not harmful food adulterants and the amounts used are so small that the food product which is to be protected against oxidation and aging is not affected with respect to taste, odor, and color.

Obviously many modifications and variations of the invention, as hereinbefore set forth, may be made without departing from the spirit and scope thereof, and, therefore, only such limitations should be imposed as are indicated in the appended claims.

We claim:
1. The method of stabilizing animal fats against rancidity which comprises adding thereto a small but effective amount of the comminuted fibrous portion of a citrus fruit, heating the mixture at a temperature of between about 100° C. and 200° C. for a time period sufficient for the fat to extract the antioxidant material from the fibrous portion of the citrus fruit and thereafter separating the spent fibrous portion of the citrus fruit from the treated fat.

2. The method of stabilizing animal fats against rancidity which comprises adding thereto from 0.1 per cent to 1.0 per cent of the comminuted fibrous portion of a citrus fruit, heating the mixture at a temperature of between about 100° C. and 200° C. for a time period sufficient for the fat to extract the antioxidant material from the fibrous portion of the citrus fruit and thereafter separating the spent fibrous portion of the citrus fruit from the treated fat.

3. A stabilized fatty material of animal origin produced by the process defined in claim 1.

4. A stabilized fatty material of animal origin produced by the process defined in claim 2.

5. The method of stabilizing lard against rancidity which comprises adding thereto from 0.1 per cent to 1.0 per cent of the comminuted fibrous portion of a citrus fruit, heating the mixture for approximately one hour at a temperature of between about 100° C. and 200° C. and thereafter filtering the lard to remove the spent fibrous portion of the citrus fruit.

6. Lard stabilized against rancidity produced by the process defined in claim 5.

MICHAEL M. PISKUR.
JAMES W. HIGGINS.

REFERENCES CITED

The following references are of record in the file of this patent:

UNITED STATES PATENTS

| Number | Name | Date |
|---|---|---|
| 1,625,641 | Douglas | Apr. 19, 1927 |
| 2,069,265 | Musher | Feb. 2, 1937 |
| 2,152,827 | Szent-Gyorgyi | Apr. 4, 1939 |
| 2,302,928 | Whitmoyer et al. | Nov. 24, 1942 |

OTHER REFERENCES

Ind. & Eng. Chem., Greenbank et al., March 1934, pages 243–245.